(No Model.)
C. B. COCHRAN.
MILK TESTER.
No. 418,499. Patented Dec. 31, 1889.
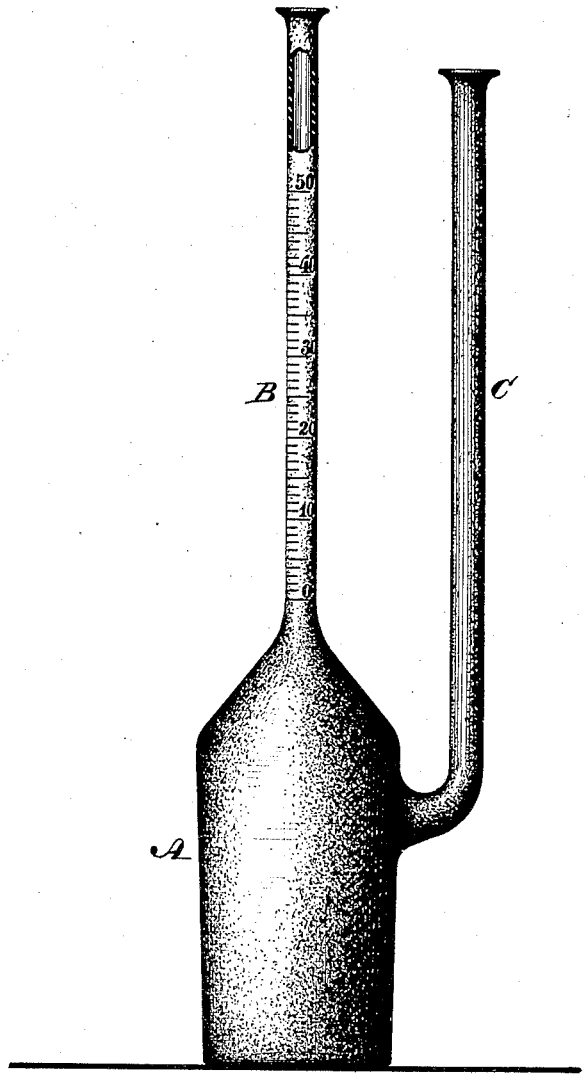

UNITED STATES PATENT OFFICE.

CARLOS B. COCHRAN, OF WEST CHESTER, PENNSYLVANIA.

MILK-TESTER.

SPECIFICATION forming part of Letters Patent No. 418,499, dated December 31, 1889.

Application filed July 3, 1889. Serial No. 316,437. (No model.)

*To all whom it may concern:*

Be it known that I, CARLOS B. COCHRAN, a citizen of the United States, residing at West Chester, in the county of Chester and State of Pennsylvania, have invented a new and useful Improvement in Milk-Testers, which improvement is fully set forth in the following specification and accompanying drawing.

My invention consists of a milk-tester formed of a flask which is provided with a supply-funnel and a graduated tube, the operation being hereinafter fully set forth.

The figure of the drawing represents a side elevation, partly broken away, of a milk-tester embodying my invention.

Referring to the drawing, A designates a flask or vessel from which rises the transparent graduated tube B as the neck thereof. Connected with the side of the flask is a supply tube or funnel C, said parts being preferably formed integral and of glass.

The operation is as follows: The milk to be tested is delivered into the flask A through the side tube and suitable acid added thereto. The flask is then placed in boiling water for ten or fifteen minutes, so that the contents of the flask are boiled, the flask being shaken once or twice near the end of the boiling process, after which it is removed and allowed to cool. Ether is now introduced into the flask through the funnel C and acts as a solvent, and the flask is shaken so that the ether mixes with the contents of the flask. The ether is then evaporated by boiling or other means and hot water added to the contents of the flask, whereby the fat separated from the milk is raised into the graduated tube, the volume and per cent. of the same thus being ascertained. It will be seen that the tube or neck B has a narrow bore, or is made of small diameter for delicate reading, while the funnel C at the side is of greater diameter, so as to readily direct the milk, acid, ether, and hot water into the flask, which is not possible with the tube, as the latter will immediately clog if either of the materials is poured thereinto.

Having thus described my invention, what I claim as new, and desire to secure by Letters Patent, is—

1. A milk-tester consisting of a flask having a graduated tube rising from the top thereof forming a neck, a supply-tube leading into the side of the flask and extending above the top thereof, the supply-tube being of greater diameter than the graduated tube, substantially as described.

2. A milk-tester consisting of a flask having a tube B rising from the top thereof and forming a neck, said tube having graduations thereon, and the supply-tube C, leading into the side of the flask, said tubes B and C being integral with the body of the flask, substantially as described.

3. A milk-tester consisting of a flask having the graduated tube B rising therefrom, the supply-tube C, leading into the side of the flask, the said tubes being integral with the body, and the tube C of greater diameter than the tube B, said parts being combined substantially as described.

CARLOS B. COCHRAN.

Witnesses:
JOHN A. WIEDERSHEIM,
A. P. JENNINGS.